H. H. PATRICK.
PISTON RING.
APPLICATION FILED JAN. 22, 1913.

1,083,130.

Patented Dec. 30, 1913.

WITNESSES
W. E. Baker

INVENTOR
Hubert Harry Patrick
BY
ATTORNEYS

UNITED STATES PATENT OFFICE.

HUBERT HARRY PATRICK, OF BIRMINGHAM, ENGLAND, ASSIGNOR TO THE OXYGEN WELDING WORKS LIMITED, OF BIRMINGHAM, ENGLAND.

PISTON-RING.

1,083,130.  Specification of Letters Patent.  Patented Dec. 30, 1913.

Application filed January 22, 1913. Serial No. 743,520.

*To all whom it may concern:*

Be it known that I, HUBERT HARRY PATRICK, subject of the King of Great Britain, residing at 50 Sandwell road, Handsworth, in the city of Birmingham, England, engineer, have invented certain new and useful Improvements Relating to Piston-Rings, of which the following is a specification.

This invention relates to piston rings, for, more especially, internal combustion engines, although it is not limited to such rings being applicable to cast iron and steel piston rings for a variety of purposes.

The invention has for its object to construct an improved ring of the coil type comprising two convolutions. It has previously been proposed to construct such rings from a pair of coils arranged parallel to each other, or in other words, with their opposite edges and the intermediate circumferential division all parallel to each other. But difficulties have been experienced in the manufacture of such rings, and it has not before been possible at moderate cost to produce machined or truly accurate faces adjacent to each other along the said division.

According to this invention a pair of cast iron, steel or other metal rings transversely divided are machined or otherwise made truly flat and smooth on the two opposite edges, and a pair of such rings are united by autogenous, electrical or other welding along a portion of their edges near a pair of opposite ends in such a way that they form a split ring having a pair of convolutions and the outer and intermediate edges all parallel to each other.

Figure 1:
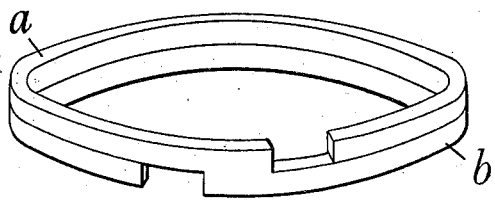
Figure 2:
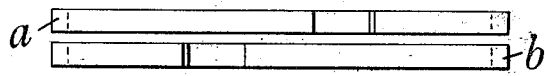
Figure 3:
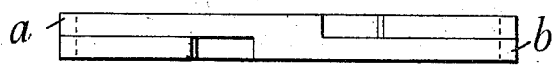
Figure 4:
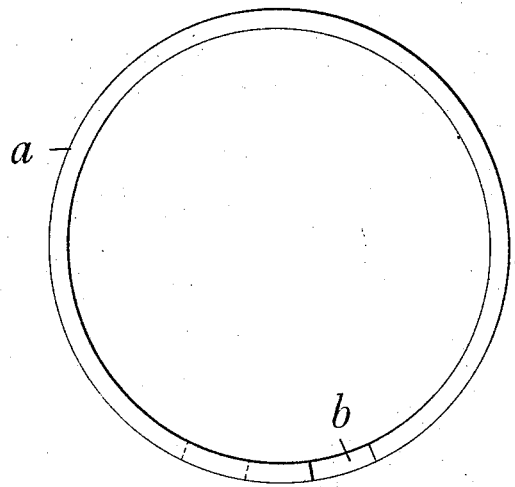

In the accompanying sheet of explanatory drawings:—Figure 1 is a perspective view of a piston ring constructed in accordance with this invention. Fig. 2 is a side elevation of the elements from which the ring is constructed. Figs. 3 and 4 are side elevation and plan of the finished ring.

In carrying the invention into effect as shown, a pair of cast iron or steel rings $a$ and $b$ (Fig. 2) are formed in any convenient manner, and all the surfaces or only the sides and outer periphery are machined to the required size. The rings are divided transversely, and a pair of opposite ends of the two rings are welded together along a portion of their side faces by autogenous, electric or other similar process. Grooves or the like may be provided in the adjacent faces of the parts to be welded to receive the welding material. The rings are subsequently cleaned up on the periphery, and are hardened if required. A finished ring is shown in Figs. 1, 3 and 4.

A ring constructed as above described is superior to the rings ordinarily employed, and is also superior to rings of similar form made by other methods. As the intermediate faces when in position lie in close contact with each other, and the gaps at the ends of the two convolutions are on opposite sides of the united portion of the convolutions no gas can pass the same.

Having thus described my invention what I claim as new and desire to secure by Letters Patent is:—

The method of making split piston rings as herein described, consisting in the employment of a pair of similar and coaxial metal rings and uniting a pair of opposite overlapping ends along a portion of their adjacent side faces by welding, substantially as described.

In testimony whereof I have signed my name to this specification in the presence of two subscribing witnesses.

HUBERT HARRY PATRICK.

Witnesses:
JOHN MORGAN,
FRANCIS MALPAS.